(No Model.)
W. MASON, Dec'd.,
F. Mason, Administrator.
ROVING TRAVERSE MOTION OF SPINNING MACHINES.
No. 311,193. Patented Jan. 27, 1885.
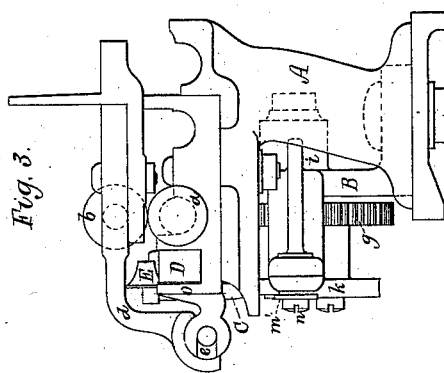
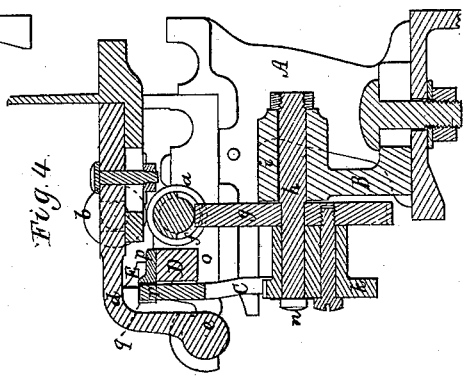
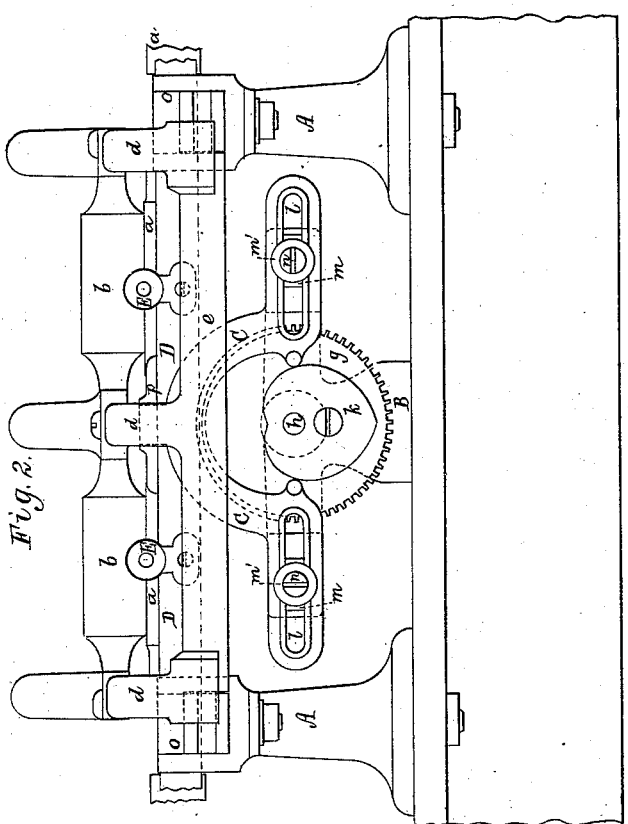
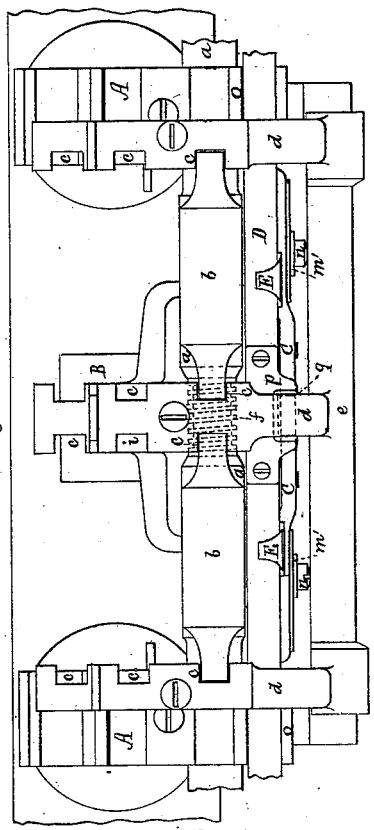
Witnesses.
S. N. Piper
E. B. Pratt
W. Mason, Dec'd.
Frederick Mason.
Administrator.
by R. H. Eddy, att'y.

United States Patent Office.

FREDERICK MASON, OF TAUNTON, MASSACHUSETTS, ADMINISTRATOR OF WILLIAM MASON, DECEASED.

ROVING TRAVERSE MOTION OF SPINNING-MACHINES.

SPECIFICATION forming part of Letters Patent No. 311,193, dated January 27, 1885.

Application filed November 26, 1883. (No model.)

*To all whom it may concern:*

Be it known that WILLIAM MASON, deceased, late a citizen of the United States of America, and a resident of Taunton, in the county of Bristol, of the Commonwealth of Massachusetts, invented while living a new and useful Improvement in Roving Traverse Motions of Spinning-Machines, the same being described in the following specification, and represented in the accompanying drawings, of which—

Figure 1 is a top view; Fig. 2, a front elevation; Fig. 3, an end view; and Fig. 4, a transverse section through the middle of Fig. 2, showing mechanism containing the said invention.

In the drawings, A denotes the stand for supporting the lower set of draw-rollers, one only of which—viz., the rear one, $a$—of the set is shown. Over this roller is its fellow roller $b$, that has its journals in vertical notches $c$ in arms $d$ projecting from a shaft, $e$, pivoted to the stand and arranged as represented. The worm or screw of the roller $a$ is shown at $f$. It engages with a worm-gear, $g$, carried on a shaft, $h$, supported in a bearing, $i$, in a standard, B, arranged as shown. Fastened on this shaft is the cam $k$, for reciprocating the arched slide C, such slide being formed and arranged with the said cam in manner as represented. The slide has two slots, $l$, formed horizontally in it and in alignment with each other, as shown, to receive studs $m$, projecting from the standard B, the slide being kept on such studs by washers $m'$ and screws $n$ properly adapted to it and them. From this it will be seen that the slide is not affixed to and made to depend from the guide-bar shown at D, but has supports independent thereof. The guide-bar D, provided with roving trumpet-shaped guides E, as shown, rests in grooved guides $o\ o$ of the roller-stand A, such guides being open at their tops to admit of the bar being lifted out of them and replaced vertically, as occasion may require. These guides also admit of the bar being reciprocated in them lengthwise of it. Furthermore, there is fixed to the bar D a notched plate, $p$, into whose notch $q$ a projection, $r$, from the slide C extends; or instead of such plate a simple stud or pin may be projected from the bar into a vertical notch made in the slide. By this means the bar and slide are held together for longitudinal movement, and yet are separable vertically.

From the above it will be seen that the guide-bar and the slide have a separable connection, such as will not only cause the bar to be moved by the slide, when such slide may be put in movement by its actuating-cam, but will admit of the guide-bar being raised out of engagement both with its sustaining-guides and the slide after the arms of the upper drawing-rolls may have been moved or turned back from over the lower rolls.

What is claimed as the invention or improvement of the aforesaid WILLIAM MASON in roving traverse mechanism of spinning-machines is—

The shaft $e$, having arms $d$, and pivoted to the stand, the stand A, having the grooved guides $o\ o$, the guide-bar D, resting on guides $o\ o$, the slide C, separably connected to the guide-bar, slide-operating devices, substantially such as shown, and the rollers $a\ b$, all combined, constructed, and arranged as and for the purpose set forth.

FREDERICK MASON,
*Administrator of the estate of William Mason, deceased.*

Witnesses:
WILLIAM MASON,
ELISHA T. JACKSON.